(12) United States Patent
Matsui (10) Patent No.: US 12,398,008 B2
(45) Date of Patent: Aug. 26, 2025

(54) IMAGE FORMING APPARATUS THAT ANNOUNCES ABNORMALITY OF SHEET

(71) Applicant: KYOCERA Document Solutions Inc., Osaka (JP)

(72) Inventor: Shinya Matsui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 120 days.

(21) Appl. No.: 18/535,717

(22) Filed: Dec. 11, 2023

(65) Prior Publication Data

US 2024/0199355 A1 Jun. 20, 2024

(30) Foreign Application Priority Data

Dec. 20, 2022 (JP) ................. 2022-203233

(51) Int. Cl.
*B65H 29/60* (2006.01)
*B65H 7/06* (2006.01)
(Continued)

(52) U.S. Cl.
CPC ............ *B65H 7/06* (2013.01); *B65H 7/125* (2013.01); *B65H 29/60* (2013.01); *G03G 15/5012* (2013.01); *G06F 3/1234* (2013.01); *G06K 15/4085* (2013.01); *B65H 2511/511* (2013.01); *B65H 2511/524* (2013.01); *B65H 2551/21* (2013.01); *B65H 2553/20* (2013.01);
(Continued)

(58) Field of Classification Search
CPC . B65H 7/12; B65H 7/125; B65H 7/06; B65H 2511/511; B65H 2511/524; B65H 29/60; B65H 29/62; B65H 43/04; G06F 3/1234; G06F 3/121; G06K 15/4085; G06K 15/408; G03G 2215/00552; G03G 15/5012; G03G 15/502; G03G 15/70; G03G 15/55; G03G 15/6552
See application file for complete search history.

(56) References Cited

U.S. PATENT DOCUMENTS

2008/0174626 A1* 7/2008 Hirao ................. G03G 15/6552
347/16
2014/0270396 A1 9/2014 Miyagawa et al.
(Continued)

FOREIGN PATENT DOCUMENTS

JP 2014198465 A 10/2014

*Primary Examiner* — Luis A Gonzalez
(74) *Attorney, Agent, or Firm* — IP Business Solutions, LLC.

(57) ABSTRACT

An image forming apparatus includes an image forming device, a sheet transport mechanism, a sheet abnormality detection device, an output tray, an escape tray, a notification device, and a control device. The escape tray is provided separately from the output tray, and receives the sheet, from which abnormality has been detected by the sheet abnormality detection device, and delivered by the sheet transport mechanism. The control device causes the image forming device to again form, on another sheet, a same image formed on a sheet, from which the sheet abnormality has been detected, and delivered to the escape tray, and to continue with the image forming operation on subsequent sheets, and decides, according to a predetermined condition, whether to allow the notification device to announce the sheet abnormality.

5 Claims, 6 Drawing Sheets

(51) Int. Cl.
*B65H 7/12* (2006.01)
*G03G 15/00* (2006.01)
*G06F 3/12* (2006.01)
*G06K 15/00* (2006.01)

(52) U.S. Cl.
CPC .................. *B65H 2553/82* (2013.01); *G03G 2215/00552* (2013.01)

(56) References Cited

U.S. PATENT DOCUMENTS

2016/0125280 A1* 5/2016 Umezawa ............ G06K 15/402
  358/1.14
2020/0371466 A1* 11/2020 Izumichi ................ B65H 29/62

* cited by examiner

IMAGE FORMING APPARATUS THAT ANNOUNCES ABNORMALITY OF SHEET

INCORPORATION BY REFERENCE

This application claims priority to Japanese Patent Application No. 2022-203233 filed on Dec. 20, 2022, the entire contents of which are incorporated by reference herein.

BACKGROUND

The present disclosure relates to an image forming apparatus, and in particular to an image forming apparatus including an image forming device that forms an image on a sheet delivered thereto.

Among existing sheet transport devices installed in image forming apparatuses, some are configured to notify a user of occurrence of abnormality of a sheet, thereby allowing the user to be immediately made aware of the occurrence of abnormality.

SUMMARY

The disclosure proposes further improvement of the foregoing techniques.

In an aspect, the disclosure provides an image forming apparatus including an image forming device, a sheet transport mechanism, a sheet abnormality detection device, an output tray, an escape tray, a notification device, and a control device. The image forming device forms an image on a sheet. The sheet transport mechanism transports the sheet to the image forming device, the sheet transport mechanism including a sheet transport route, and a transport device provided on the sheet transport route and configured to transport the sheet. The sheet abnormality detection device detects abnormality of the sheet, including multi feed and a state of partially missing. The output tray receives the sheet transported by the sheet transport mechanism and on which an image has been formed by the image forming device. The escape tray is provided separately from the output tray, and receives the sheet, from which abnormality has been detected by the sheet abnormality detection device, and delivered by the sheet transport mechanism. The notification device announces sheet abnormality. The control device includes a processor, and controls an overall operation of the image forming apparatus. The control device causes the image forming device to again form, on another sheet, a same image formed on a sheet, from which the sheet abnormality has been detected, and delivered to the escape tray, and to continue with the image forming operation on subsequent sheets, and decides, according to a predetermined condition, whether to allow the notification device to announce the sheet abnormality.

DETAILED DESCRIPTION

Hereafter, an image forming apparatus according to an embodiment of the disclosure will be described, with reference to the drawings. In the drawings, the same or corresponding elements are given the same numeral, and the description of such elements will not be repeated.

[Image Forming Apparatus]

Figure 1:
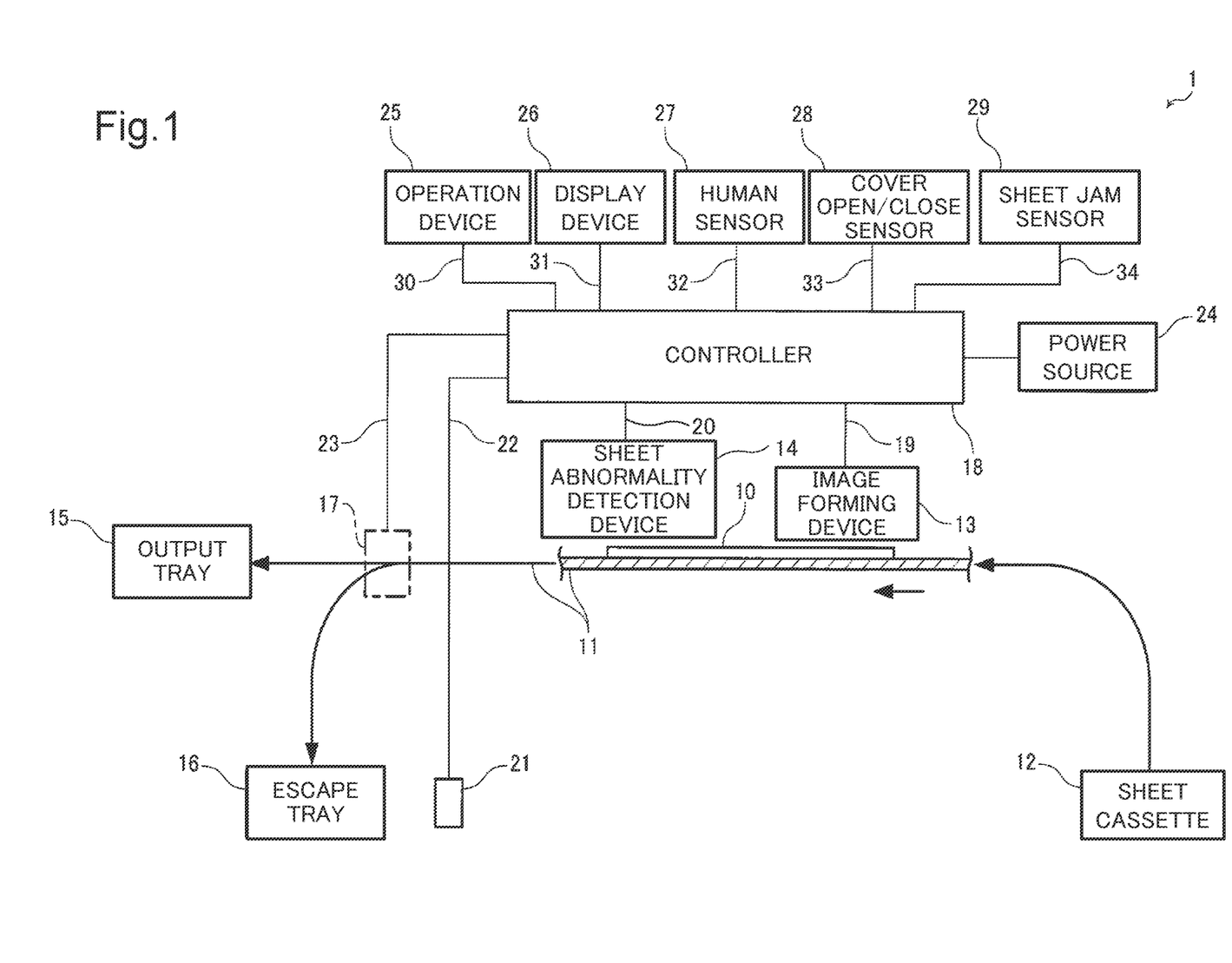
FIG. 1 is a block diagram showing a configuration of an image forming apparatus according to an embodiment of the disclosure.

FIG. 1 is a block diagram showing a configuration of the image forming apparatus, including a sheet transport device, according to the embodiment of the disclosure.

The image forming apparatus 1 shown in FIG. 1 includes an adsorbing transport belt 11 for transporting a sheet 10. The adsorbing transport belt 11 passes an image forming device 13 and a sheet abnormality detection device 14, carrying thereon the sheet 10 delivered from a sheet cassette 12. Here, although FIG. 1 illustrates an example where the image forming device 13 and the sheet abnormality detection device 14 are aligned in this order, along a transport direction of the adsorbing transport belt 11, the image forming device 13 and the sheet abnormality detection device 14 may be aligned in the reverse order, along the transport direction of the adsorbing transport belt 11. A sheet transport route is provided, in the section between the sheet cassette 10 and the image forming device 13, and between the image forming device 13 and an output tray 15 or an escape tray 16. The sheet transport route includes transport roller pairs that transport the sheet. The adsorbing transport belt 11 may instead be some transport roller pairs. The adsorbing transport belt 11 and the transport roller pairs exemplify the transport device in the disclosure.

The image forming device 13 forms an image on the sheet 10, transported from the sheet cassette 12 by the transport device such as the adsorbing transport belt 11. The image forming method is not specifically limited, and one of generally known image forming methods may be employed.

The sheet abnormality detection device 14 serves to detect sheet abnormality, for example by detecting multi feed of the sheets 10 adjacent to each other, and/or a partially missing portion of the sheet 10. The sheet abnormality detection device 14 may be constituted, for example, of a known multi feed sensor, or an image processor that detects a partially missing portion of the sheet, through an image processing operation.

The image forming apparatus 1 shown in FIG. 1 includes the output tray 15. The output tray 15 serves as the delivery destination for the sheet 10 having thereon an image formed by the image forming device 13, and from which no sheet abnormality has been detected by the sheet abnormality detection device 14. The image forming apparatus 1 shown in FIG. 1 also includes the escape tray 16. The escape tray 16 serves as the delivery destination for the sheet 10 that has undergone the image forming operation by the image forming device 13, and the detection of sheet abnormality by the sheet abnormality detection device 14, through which the sheet abnormality has been detected.

The selection of the delivery destination is performed by a branching device 17. The branching device 17 includes, for example, a known branching nail for shifting the transport route of the sheet 10. The operation of the branching device 17 is controlled by a controller 18. The controller 18 exemplifies the control device in the disclosure.

The image forming apparatus 1 shown in FIG. 1 includes the controller 18 for controlling each of the components of the sheet transport device. The controller 18 includes a processor, such as a central processing unit (CPU) or a micro processing unit (MPU).

Between the controller 18 and the image forming device 13, a control signal line 19 for controlling the operation of the image forming device 13, with the controller 18, is provided. Between the sheet abnormality detection device 14 and the controller 18, an abnormality detection signal line 20 is provided.

A sheet sensor 21 that detects whether a sheet, from which abnormality has been detected, is located on the escape tray 16, is provided on the escape tray 16, or in the proximity thereof. The sheet sensor 21 is, for example, an optical sensor having a light emitter and a photodetector. The sheet sensor 21 and the controller 18 are connected to each other via a sheet presence detection signal line 22, for transmitting a detection signal from the sheet sensor 21 to the controller 18. The sheet sensor 21 serves to ensure that the presence of the sheet, from which abnormality has been detected, on the escape tray 16, can be detected without fail.

Between the controller 18 and the branching device 17, a switching action control signal line 23, for activating the branching device 17 with the controller 18, is provided.

The controller 18 receives power from a power source 24. Although details are not illustrated, the power source 24 serves to supply power to each of the components of the image forming apparatus 1 shown in FIG. 1, in addition to the controller 18. The power source 24 includes an on/off switch, for turning on and off the operation of the power source 24.

To the controller 18, an operation device 25, a display device 26, a human sensor 27, an open/close sensor 28 for the cover of the apparatus, and a sheet jam sensor 29 are connected via signal transmission lines 30, 31, 32, 33, and 34, respectively.

The operation device 25 includes hard keys such as a start key and numeric keys, and receives inputs of instructions corresponding to those keys. The display device 26 includes, for example, a liquid crystal display (LCD). The human sensor 27 is, for example, a known infrared sensor, and detects the user located within a predetermined range (e.g., 1 meter) from the image forming apparatus 1. The open/close sensor 28 includes a mechanical switch, to be turned on by the pressure of the cover when the cover is closed, and turned off by being released from the pressure of the cover, when the cover is opened. The sheet jam sensor 29 is, for example, an optical sensor having a light emitter and a photodetector, provided at each of predetermined positions on the sheet transport route, to detect whether the sheet 10 is located between the light emitter and the photodetector.

[Operation]

Hereunder, operations of the image forming apparatus 1 and the sheet transport device shown in FIG. 1 will be described. When an image is to be formed on the sheet 10, the user inputs an instruction to form the image, through the operation device 25. Then the controller 18 starts to control the action of the sheet transport mechanism, including the transport device such as the adsorbing transport belt 11. The sheet transport mechanism transports one of the sheets 10 drawn out from the sheet cassette 12. The image is formed on the surface of the sheet 10 being transported by the sheet transport mechanism, by the image forming device 13.

The sheet 10 then undergoes the detection of abnormality, by the sheet abnormality detection device 14. The sheet 10 from which no abnormality has been detected is transported to the output tray 15, by the adsorbing transport belt 11. The sheet 10 from which abnormality has been detected is transported to the escape tray 16, instead of the output tray 15. The switching of the transport destination between the output tray 15 and the escape tray 16 is performed by the branching device 17, under the control of the controller 18.

Hereinafter, a sheet from which abnormality has been detected may be referred to as "invalid sheet", and a sheet from which no abnormality has been detected may be referred to as "valid sheet".

Here, in the case where, unlike the example described above, the sheet abnormality detection device 14 and the image forming device 13 are aligned in this order, along the transport direction of the sheet 10 by the transport device such as the adsorbing transport belt 11, the sheet 10 undergoes the detection of abnormality by the sheet abnormality detection device 14, before undergoing the image forming operation by the image forming device 13. In such a case, the image forming operation by the image forming device 13 is successively performed, under the control of the controller 18, when no abnormality of the sheet 10 has been detected, and thereafter the valid sheet, in other words the sheet 10 having the image formed thereon, is delivered to the output tray 15. When abnormality is detected from the sheet 10, the sheet 10 from which the abnormality has been detected, in other words the invalid sheet, is delivered to the escape tray 16, under the control of the controller 18, without undergoing the image forming operation by the image forming device 13, in other words remaining blank.

When the abnormality of the sheet 10 is detected by the sheet abnormality detection device 14, and the sheet 10 having the abnormality is delivered to the escape tray 16 without undergoing the image forming operation by the image forming device 13, under the control of the controller 18, the image that was supposed to be formed on such sheet 10, in other words the invalid sheet, is formed as scheduled on the next sheet 10 transported from the sheet cassette 12. The next sheet 10 also undergoes the detection of abnormality by the sheet abnormality detection device 14.

Figure 2:
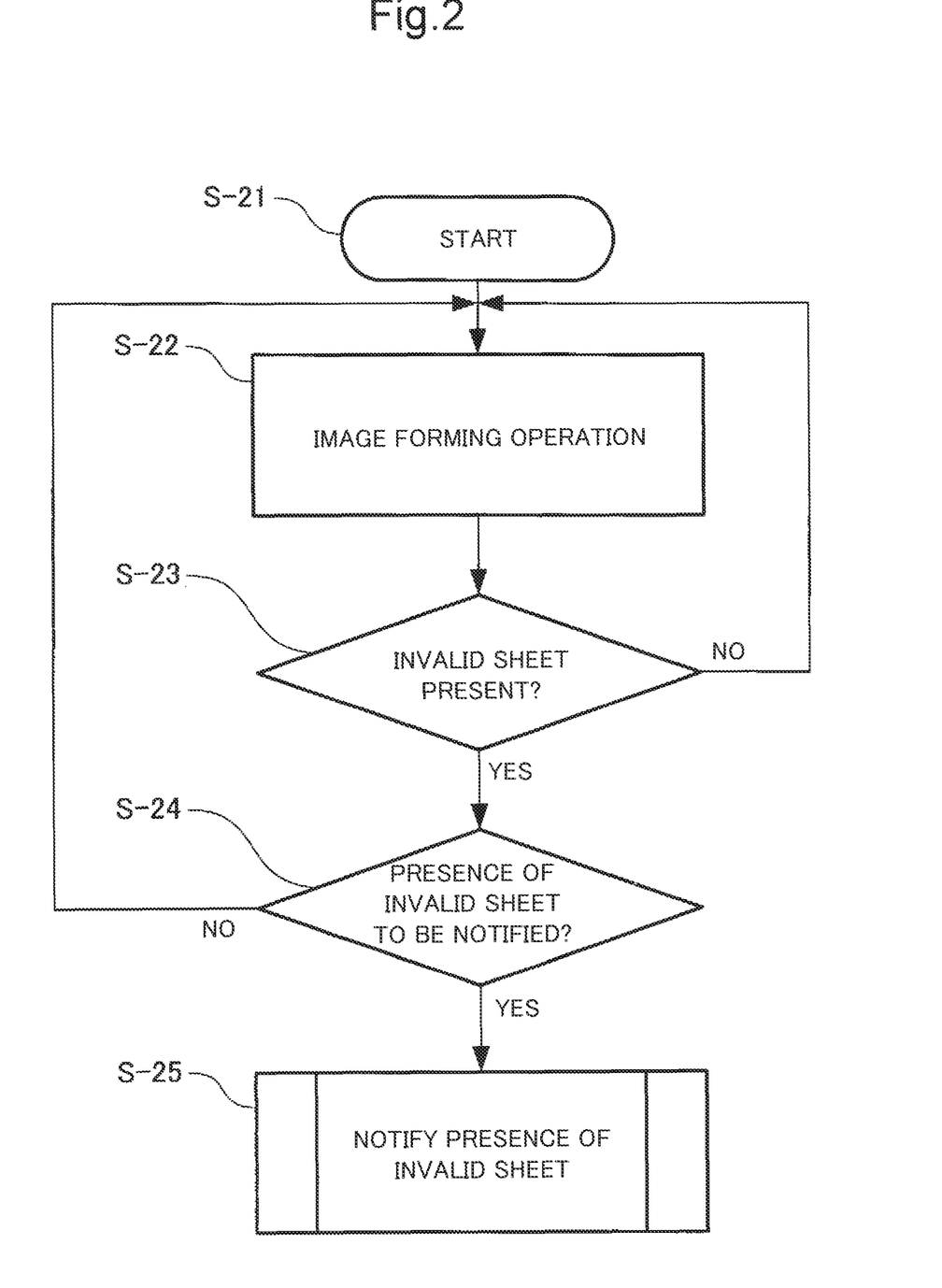
FIG. 2 is a flowchart showing an operation performed by the image forming apparatus shown in FIG. 1.

The image forming apparatus 1 shown in FIG. 1 is configured to continue with the image forming operation on the subsequently delivered sheets 10, under the control of the controller 18, without immediately notifying the user of the occurrence of abnormality, even when the invalid sheet is detected. Such operation will be described in detail hereunder, with reference to FIG. 2 and FIG. 1. FIG. 2 is a flowchart showing the operation of the image forming apparatus 1 shown in FIG. 1.

Referring to FIG. 2, when the instruction to start the image forming operation is received through the operation device 25 (step S-21), the controller 18 performs the image forming operation on the sheet 10 (step S-22). The image forming operation includes causing the image forming device 13 to form the image on the sheet 10, and causing the sheet abnormality detection device 14 to detect abnormality from the sheet 10.

When no abnormality is detected by the sheet abnormality detection device 14 from the sheet 10, the sheet 10 is transported, with the image formed thereon, to the output tray 15, under the control of the controller 18. In this case, the sheet sensor 21 provided on the escape tray 16 does not detect the presence of the invalid sheet on the escape tray 16, at step S-23 (NO at step S-23). The sheet sensor 21 transmits the data indicating that the invalid sheet has not been detected, to the controller 18.

Then the operation returns to step S-22, where the image forming operation is performed on the next sheet 10, under the control of the controller 18, including the image forming on the next sheet 10 by the image forming device 13, and the detection of abnormality by the sheet abnormality detection device 14, from the sheet 10.

When it is decided that the sheet abnormality detection device 14 has detected abnormality from the sheet 10, such sheet 10, in other words the invalid sheet, is transported to the escape tray 16, under the control of the controller 18. In this case, the sheet sensor 21 provided on the escape tray 16 detects the presence of the invalid sheet on the escape tray 16 at step S-23 (YES at step S-23), and transmits the detection data to the controller 18.

The controller 18 decides, at step S-24, whether the presence of the invalid sheet is scheduled to be notified. For example, in the case where the user inputs in advance the instruction to output the notice of the presence of the invalid sheet, through the operation device 25, the controller 18 stores such instruction in a memory, to make the mentioned decision. Alternatively, the notice is to be outputted on the basis of some other operations, the detail of which will be subsequently described. In the case where the outputting of the notice is not scheduled (NO at step S-24), the operation returns to step S-22, where the image forming operation is performed on the next sheet 10, under the control of the controller 18, including the image forming on the next sheet 10 by the image forming device 13, and the detection of abnormality by the sheet abnormality detection device 14, from the sheet 10.

In the case where the presence of the invalid sheet is scheduled to be notified at step S-24 (YES at step S-24), the controller 18 notifies the user, only in such a case, of the presence of the invalid sheet on the escape tray 16, for example by causing the display device 26 to display a message to the effect that the invalid sheet is present on the escape tray 16 (step S-25). In the image forming apparatus 1 shown in FIG. 1, the display device 26 controlled by the controller 18 serves as a notification device of the presence of the invalid sheet. The notification device may be constituted of an optionally selected device other than the display device 26, provided that such device is capable to outputting the mentioned notice. After step S-25, the controller 18 suspends the image forming on the sheet 10 by the image forming device 13, and the detection of abnormality from the sheet 10 by the sheet abnormality detection device 14. Here, the controller 18 may cause, after step S-25, the image forming device 13 to continue to form the same image that was formed on the sheet 10 delivered to the escape tray 16 because of the sheet abnormality, on another sheet, and cause the sheet abnormality detection device 14 to continue to detect abnormality from the sheet 10.

In this embodiment, as described above, the controller 18 causes the image forming device 13 to again form, on another sheet, the same image that was formed on the sheet 10 delivered to the escape tray 16 because of the sheet abnormality, and to continue with the image forming operation on the subsequent sheets, and decides, according to a predetermined condition, whether to cause the display device 26 to announce the sheet abnormality.

The mentioned arrangement enables the image forming operation on the sheet 10 to be continued, in the event that the sheet abnormality has been detected, in other words that the invalid sheet has appeared, without notifying the user of such event. Thereafter, the event can be notified to the user, at the time that the notification of the presence of the invalid sheet is requested, in which case the collection work of the invalid sheets by the user can be minimized, and consequently the downtime of the apparatus can be minimized.

[Notice to User and Operation]

Hereunder, some conditions that allow the notification device to notify the user of the presence of the invalid sheet on the escape tray 16 will be described. For example, when the user is located within a predetermined range (e.g., 1 meter) from the image forming apparatus 1, the controller 18 outputs the notice to the user. In addition, when sheet jam occurs, the controller 18 notifies the user of the presence of the invalid sheet on the escape tray 16, along with the notification of the occurrence of the sheet jam.

Example 1 of Notice to User and Operation

Figure 3:
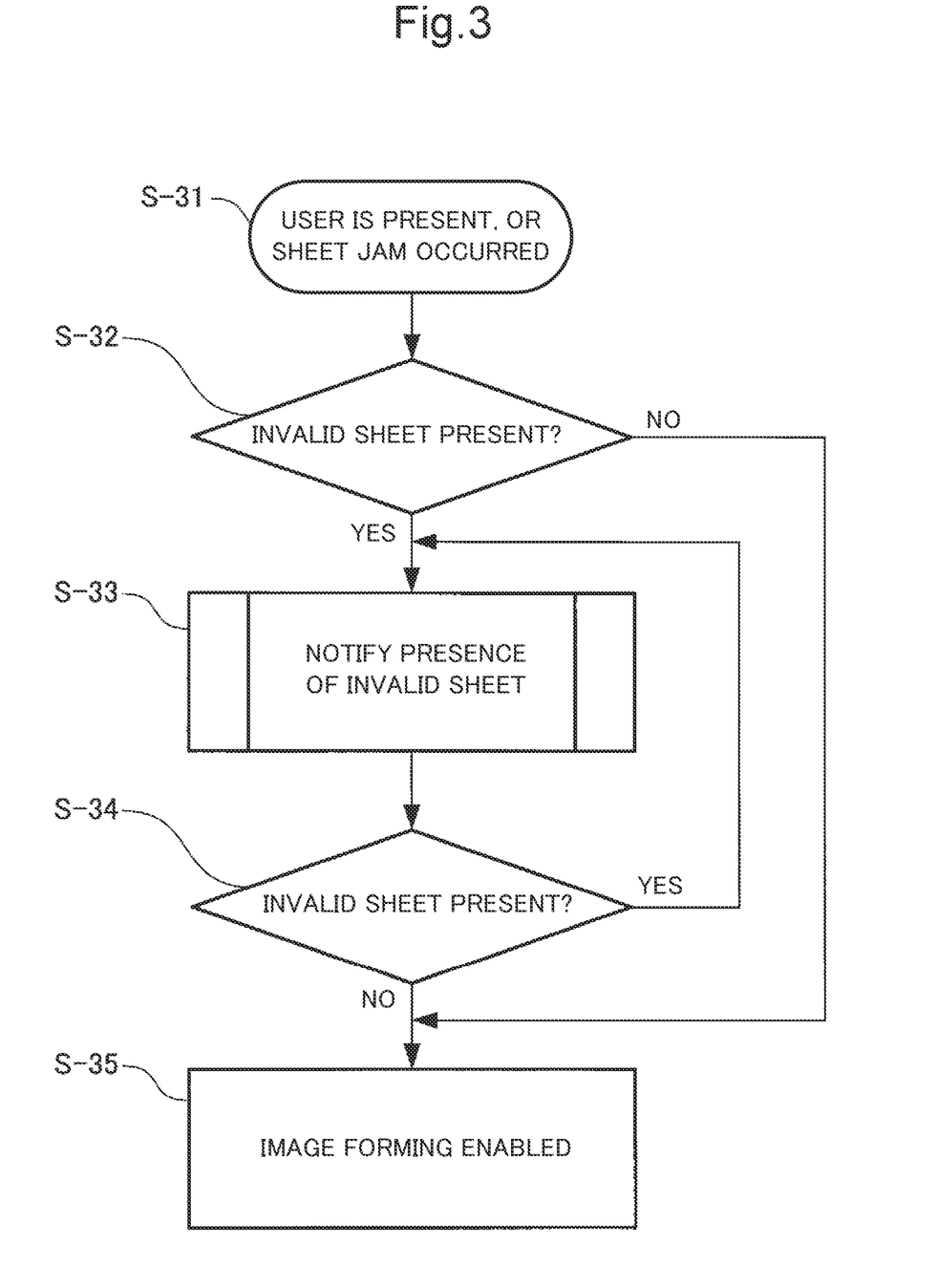
FIG. 3 is a flowchart showing a process of notifying a content of an escape tray to a user and subsequent operation, to be performed when the user is present in the proximity of the image forming apparatus, or when sheet jam has occurred.

In this case, it is preferable to output the notice to the user, at a timing other than during the image forming operation on the sheet 10. As an example of outputting the notice to the user, at a timing other than during the image forming operation on the sheet 10, FIG. 3 represents a process of notifying the content of the escape tray to the user and subsequent operation, to be performed when the user is located within the predetermined range from the image forming apparatus, or when sheet jam has occurred. Here, the situation where the user is located within the predetermined range from the image forming apparatus 1 encompasses the concept representing the case where the user is located in the proximity of the image forming apparatus 1.

The flowchart shown in FIG. 3 represents the operation performed when the user is located within the predetermined range from the image forming apparatus 1, at the timing other than during the image forming operation on the sheet 10. In this case, the image forming apparatus 1 is on standby ready to perform the image forming on the sheet 10. Examples of the situation where the user is located within the predetermined range from the image forming apparatus 1 include when the human sensor 27 shown in FIG. 1, exemplifying the user detection device in the disclosure, has detected the presence of the user, when the power source 24 has been turned on, and when the cover open/close sensor 28, serving as the user detection device, has detected that the cover of the image forming apparatus 1 has been opened. In addition, the timing other than during the image forming operation on the sheet 10 includes, for example, the timing after the controller 18 has caused the image forming device 13 to execute the image forming operation of a series of images on the sheets 10, and has caused the sheet transport mechanism to deliver the sheets 10, on which the series of images have been respectively formed, to the output tray 15 or the escape tray 16.

For example, when the human sensor 27 shown in FIG. 1 has detected the presence of the user, the controller 18 decides that the user is located within the predetermined range from the image forming apparatus 1 (step S-31). Upon deciding that the user is located within the predetermined range from the image forming apparatus 1, the controller 18 decides whether the invalid sheet is present on the escape tray 16, on the basis of the detection signal from the sheet sensor 21 (step S-32).

Upon deciding at step S-32 that the invalid sheet is not present on the escape tray 16, the controller 18 keeps the image forming apparatus 1 in the standby state, ready to form an image on the sheet 10 (step S-35).

Upon deciding at step S-32 that the invalid sheet is present on the escape tray 16, the controller 18 transmits a signal indicating the instruction to output the notice, to the display device 26 serving as the notification device, thereby causing the display device 26 to notify the user of the presence of the invalid sheet (step S-33). The method of notifying is the same as in the case of FIG. 2.

At step S-34, the controller 18 decides whether the user has removed the invalid sheet from the escape tray 16, thereby making the escape tray 16 without the invalid sheet. Upon detecting that the invalid sheet is not present, on the basis of the detection signal from the sheet sensor 21 (NO at step S-34), the controller 18 sets the image forming apparatus 1 to the standby state ready to form an image on the sheet 10 (step S-35). In other words, the controller 18 restricts the image forming device 13 from performing the image forming operation, until the sheet from which abnormality was detected is removed from the escape tray and the notice is cancelled, and allows the image forming device 13 to perform the image forming operation, when the sheet from which abnormality was detected is removed from the escape tray and the notice is cancelled. Accordingly, the user is led to remove the invalid sheet from the escape tray 16, in order to resume the image forming operation, and therefore the sheet from which abnormality was detected can be surely removed from the escape tray 16.

Upon deciding at step S-34 that the invalid sheet still remains on the escape tray 16, on the basis of the detection signal from the sheet sensor 21, the controller 18 returns to step S-33, to continue with notifying the user of the presence of the invalid sheet on the escape tray 16.

Thus, when the invalid sheet is present on the escape tray 16, the image forming apparatus 1 shown in FIG. 1 does not resume the operation, unless the user removes the invalid sheet. Therefore, the invalid sheet can be surely removed from the escape tray 16.

In addition, since the notice to the effect that the invalid sheet is present on the escape tray 16 is outputted when the user is located within the predetermined range from the image forming apparatus 1, the user can surely be made aware of the presence of the invalid sheet.

Many of existing image forming apparatuses are configured to immediately notify the user of the occurrence of the sheet abnormality, once the sheet abnormality occurs, thereby immediately making the user aware of the occurrence of the abnormality. However, in recent years, in particular in the commercial printing industry, it is becoming more and more important to reduce the downtime per unit time of the apparatus, in order to maintain the productivity. From such a viewpoint, immediately notifying the user of the occurrence of abnormality, once the abnormality occurs, incurs a downtime including suspending of the operation for the purpose of inspection, or collection of the sheet with the abnormality. Moreover, when the user is not located in the proximity of the apparatus, at the time that the notice is outputted, with the operation of the apparatus suspended, the time before the cancellation of the notice is further prolonged.

According to the foregoing embodiment, in contrast, the notice of the occurrence of the sheet abnormality is not immediately outputted once the abnormality occurs, but outputted at an appropriate timing, without interruption of the printing operation, and therefore the downtime of the apparatus can be minimized.

Variation of Operation Example 1

In the foregoing example, the detection of the user located within the predetermined range from the image forming apparatus 1 is performed by the human sensor 27, serving as the user detection device. Otherwise, the presence of the user within the predetermined range from the image forming apparatus 1 can be detected, for example, when the power source 24 is turned on, and when the cover open/close sensor 28, serving as the user detection device, detects that the cover of the image forming apparatus 1 has been opened. Such cases are based on a different detection principle as to whether the user is located within the predetermined range from the image forming apparatus 1, compared with the case of utilizing the detection result from the human sensor 27. However, the operation performed after the detection is the same as the flowchart shown in FIG. 3.

Example 2 of Notice to User and Operation

Hereunder, the operation performed to notify the user of the presence of the invalid sheet on the escape tray 16, along with the notification of the occurrence of the sheet jam, will be described in detail.

Upon detecting the occurrence of sheet jam in the image forming apparatus 1, on the basis of the detection signal from the sheet sensor 21, the controller 18 causes, for example, the display device 26 to notify the user of the occurrence of the sheet jam. The user resolves the sheet jam, in response to the notice. When the invalid sheet is present on the escape tray 16 in this case, notifying the user of the presence of the invalid sheet can urge the user to remove the invalid sheet. In general, the notice of sheet jam is outputted, irrespective of whether the user is present in the proximity of the image forming apparatus 1. When the sheet jam occurs, the user makes access to the image forming apparatus 1 without fail, to resolve the sheet jam. Accordingly, notifying the user of the presence of the invalid sheet on the escape tray 16 also, irrespective of the detection result as to whether the user is present in the proximity of the image forming apparatus 1, along with the notice of the occurrence of the sheet jam, enables the user who has made access to the image forming apparatus 1 to be surely notified of those events, thereby motivating the user to both resolve the sheet jam and remove the invalid sheet from the escape tray 16, at the same timing.

To be more specific, when the sheet jam sensor 29 detects the occurrence of the sheet jam (step S-31 in FIG. 3), the controller 18 starts the operation of step S-32 and the subsequent steps shown in FIG. 3. The operation according to those steps corresponds to "Example 1 of Notice to User and Operation" described earlier.

In the case where the invalid sheet is present on the escape tray 16, at the time that the sheet jam has occurred, the controller 18 sets the image forming apparatus 1 to the standby state ready to form an image on the sheet 10, when the user removes the invalid sheet and the sheet sensor 21 detects that the invalid sheet is not present. In other words, the image forming apparatus 1 does not resume the operation despite the sheet ham having been resolved, unless the user removes the invalid sheet. The mentioned arrangement motivates the user to remove the invalid sheet from the escape tray 16, at the time that the sheet jam has occurred.

Example 3 of Notice to User and Operation

Another example of "notice to user and operation" is allowing the user to select one of (a) giving priority to the image forming on the sheet 10, to outputting the notice, and (b) giving priority to outputting the notice to the user, despite the image forming on the sheet 10 being performed, for example suspending the series of image forming operations on the sheets 10, thereby urging the user to remove the invalid sheet from the escape tray 16.

The case (a) will be described in detail hereunder. In the image forming apparatus 1, the image forming device 13 is basically configured to continue with the image forming operation on the subsequent sheets 10, even when sheet abnormality is detected. Further detail will be described with reference to FIG. 4.

Figure 4:
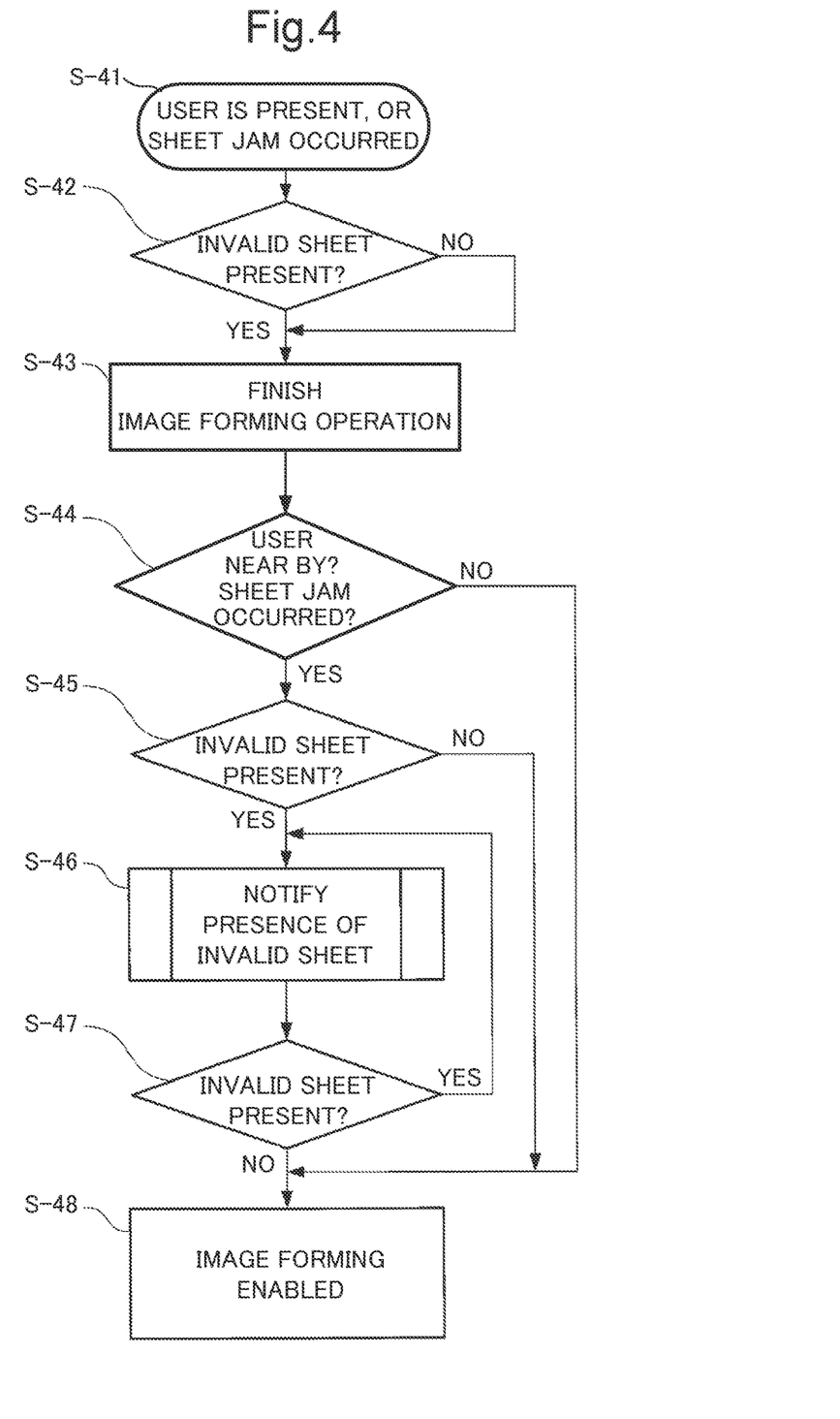
FIG. 4 is a flowchart showing a process of notifying the content of the escape tray to the user, with priority given to image forming operation, to be performed when the user is present within a predetermined range from the image forming apparatus, or when sheet jam has occurred.

FIG. 4 is a flowchart showing the operation performed when the user selects notifying the content of the escape tray to the user, with priority given to the image forming operation, when the user is present within the predetermined range from the image forming apparatus, or when sheet jam has occurred. Referring to FIG. 4, for example when it is detected at step S-41, as in the case of FIG. 3, that the user is located within the predetermined range from the image forming apparatus 1, or that sheet jam has occurred, during the image forming operation, the controller 18 starts the operation of step S-42 and the subsequent steps. At step S-42, the controller 18 decides whether the invalid sheet is present on the escape tray 16, on the basis of the detection signal from the sheet sensor 21. Then the controller 18 completes the series of image forming operations on the sheets 10 at step S-43, irrespective of whether the invalid sheet is present on the escape tray 16.

Then the controller 18 decides at step S-44 whether the user is present within the predetermined range from the image forming apparatus, or whether sheet jam has occurred. In the case where the user is not present within the predetermined range from the image forming apparatus, and sheet jam has not occurred (NO at step S-44), the controller 18 keeps the image forming apparatus 1 in the standby state ready to form an image on the sheet 10 (step S-48).

Upon deciding at step S-44 that the user is present within the predetermined range from the image forming apparatus, or that sheet jam has occurred, the controller 18 performs the operation of step S-45 to step S-48. The operation of step S-45 to step S-48 is the same as the operation of step S-32 to step S-35 shown in FIG. 3. Therefore, the description of those steps will not be repeated.

Example 4 of Notice to User and Operation

Figure 5:
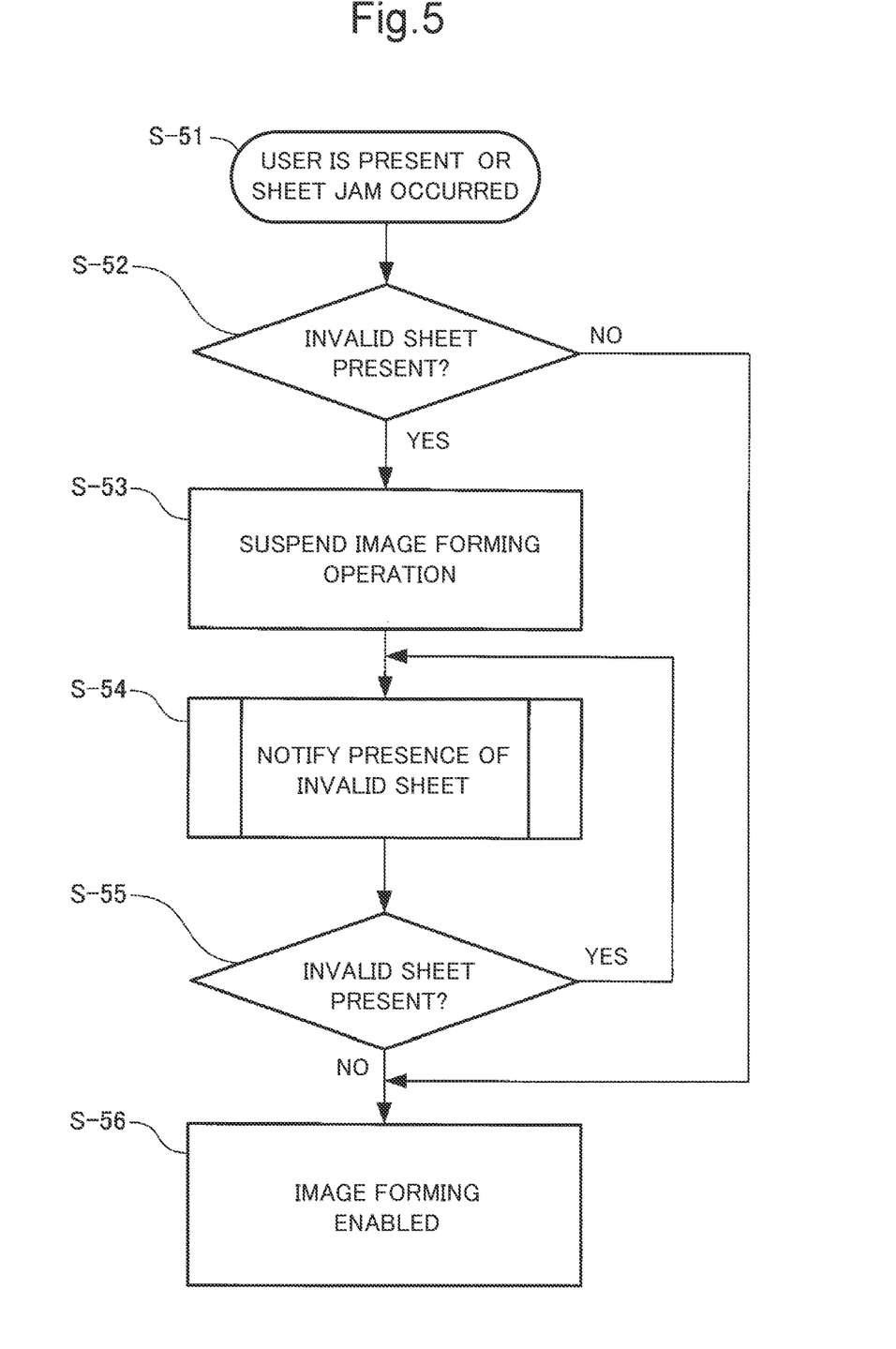
FIG. 5 is a flowchart showing a process of notifying the content of the escape tray to the user, with the image forming operation suspended, to be performed when the user is present within the predetermined range from the image forming apparatus, or when sheet jam has occurred.

Referring to FIG. 5, the case of (b), exceptionally giving priority to outputting the notice to the user, despite the image forming on the sheet 10 being performed, for example suspending the series of image forming operations on the sheets 10, thereby urging the user to remove the invalid sheet from the escape tray 16, will be described in detail hereunder. FIG. 5 is a flowchart showing the operation performed when the user selects notifying the content of the escape tray to the user, with the image forming operation suspended, when the user is present within the predetermined range from the image forming apparatus, or when sheet jam has occurred.

Referring to FIG. 5, for example when it is detected at step S-51, as in the case of FIG. 3, that the user is located within the predetermined range from the image forming apparatus 1, or that sheet jam has occurred, during the image forming operation, the controller 18 starts the operation of step S-52 and the subsequent steps. At step S-52, the controller 18 decides whether the invalid sheet is present on the escape tray 16. Upon deciding at step S-52 that the invalid sheet is not present on the escape tray 16, the controller 18 keeps the image forming apparatus 1 in the standby state ready to form an image on the sheet 10 (step S-56). The mentioned steps are the same as those of FIG. 3.

Upon deciding at step S-52 that the invalid sheet is present on the escape tray 16, the controller 18 causes, for example at this point, the image forming device 13 to suspend the image forming operation on the sheet 10 (step S-53). Then the controller 18 notifies the user of the presence of the invalid sheet on the escape tray 16 (step S-543). The notification method is the same as the case of FIG. 2.

After step S-54, the controller 18 performs the operation of step S-55 and step S-56. The operation of step S-54 to step S-56 is the same as the operation of step S-33 to step S-35 shown in FIG. 3. Therefore, the description of those steps will not be repeated.

The controller 18 performs the operation including one of (a) giving priority to the image forming on the sheet 10, to outputting the notice, and (b) giving priority to outputting the notice to the user, despite the image forming on the sheet 10 being performed, for example suspending the series of image forming operations on the sheets 10, thereby urging the user to remove the invalid sheet from the escape tray 16.

Thus, the operations of (a) and (b) can be selectively performed when the invalid sheet appears, and the presence of the invalid sheet on the escape tray 16 can be notified to the user, or kept from being notified to the user, at the time that the invalid sheet has been detected, according to the operation performed by the user on the operation device 25, in this case serving as the selection device. Allowing thus the user to select one of the operations (a) and (b) enables the image forming apparatus 1 to flexibly operate, under various conditions.

Example 5 of Notice to User and Operation

The image forming apparatus 1 shown in FIG. 1 may be given a sleep function. The sleep function refers to a function to set the apparatus to an energy-saving mode. The controller 18 sets the image forming apparatus 1 to a sleep state, by performing the sleep function.

Figure 6:
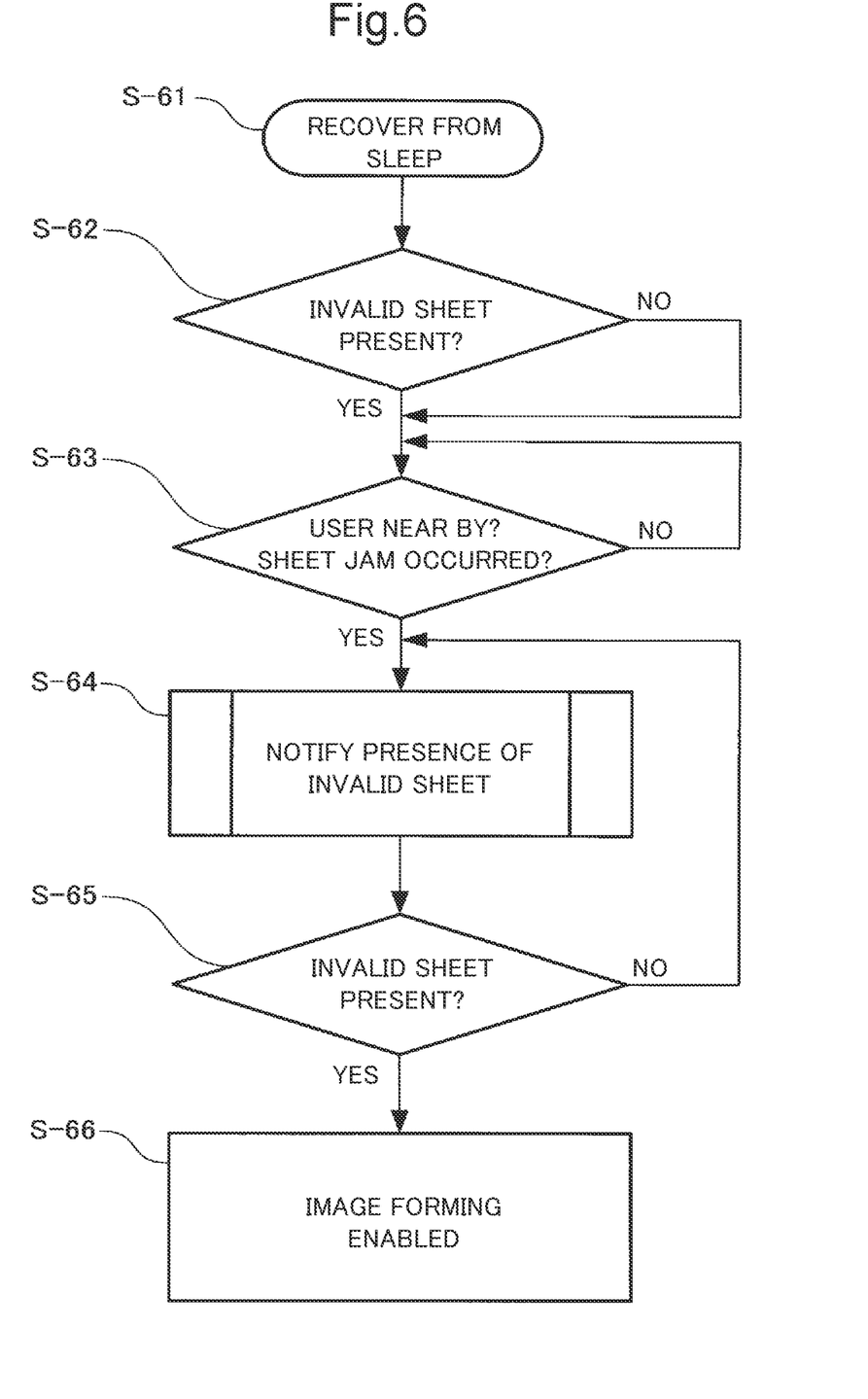
FIG. 6 is a flowchart showing an operation after recovery from a sleep mode, performed when the image forming apparatus has a sleep function.

Referring to FIG. 6, an operation to cancel the sleep mode and recover from the sleep state, performed when the image forming apparatus 1 has the sleep function, will be described hereunder. FIG. 6 is a flowchart showing the operation after recovery from the sleep mode, performed when the image forming apparatus has the sleep function.

Upon waking the image forming apparatus 1 from the sleep mode at step S-61, the controller 18 detects whether the invalid sheet is present on the escape tray 16 (step S-62). The controller 18 does not notify the user of the occurrence of sheet abnormality, irrespective of whether the invalid sheet is present on the escape tray 16, and decides whether the user is located in the proximity of the image forming apparatus 1, or whether sheet jam has occurred (step S-63).

In the case where the user is not located within the predetermined range from the image forming apparatus 1, and the sheet jam has not occurred, the controller 18 restricts the image forming apparatus 1 from outputting the notice, and from suspending the image forming operation. In contrast, upon deciding at step S-63 that the user is located within the predetermined range from the image forming apparatus 1, or that the sheet jam has occurred, the controller 18 performs the operation of step S-64 to step S-66. The operation of step S-64 to step S-66 is the same as the operation of step S-33 to step S-35 shown in FIG. 3. Therefore, the description of those steps will not be repeated.

In other words, in the case where the controller 18 once sets the image forming apparatus 1 to the sleep mode, and then cancels the same, the controller 18 restricts the display device 26, serving as the notification device, from outputting the notice of sheet abnormality, despite the sheet sensor 21 having detected that the sheet 10 is present on the escape tray 16, and allows the display device 26 to output the notice of the sheet abnormality, when the human sensor 27 detects the presence of the user or when the sheet jam sensor 29 detects the occurrence of sheet jam, after the sleep mode is cancelled. Thereafter, the controller 18 restricts the image forming device 13 from performing the image forming operation, until causing the display device 26 to erase the notice of the sheet abnormality, because of the sheet sensor 21 no longer detecting the presence of the sheet 10 on the escape tray 16. This is because, while the image forming apparatus 1 is in the sleep mode, the image forming apparatus 1 is kept from being utilized by the user, for example from receiving an instruction inputted by the user through the operation device 25, and therefore it may not always be beneficial to give the aforementioned motivation to the user during the sleep state, by notifying the sheet abnormality.

With the arrangement according to the foregoing embodiment, therefore, also when the image forming apparatus 1 has the sleep function, the user can be motivated to resolve the sheet jam, and to remove the invalid sheet from the escape tray 16, at the timing that the sleep mode is cancelled.

The embodiment of the disclosure has been described as above, with reference to the drawings. However, the disclosure is not limited to the foregoing embodiment, but may be modified in various manners, without departing from the scope of the disclosure. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

INDUSTRIAL APPLICABILITY

The disclosure provides the image forming apparatus, in particular the sheet transport mechanism installed therein, and is therefore industrially applicable.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an image forming device that forms an image on a sheet;
a sheet transport mechanism that transports the sheet to the image forming device, the sheet transport mechanism including a sheet transport route, and a transport device provided on the sheet transport route and configured to transport the sheet;
a sheet abnormality detection device that detects abnormality of the sheet, including multi feed and a state of partially missing;
an output tray that receives the sheet transported by the sheet transport mechanism, and on which an image has been formed by the image forming device;
an escape tray that receives the sheet, from which abnormality has been detected by the sheet abnormality detection device, and delivered by the sheet transport mechanism, the escape tray being provided separately from the output tray;
a notification device that announces sheet abnormality; and
a control device including a processor, and configured to control an overall operation of the image forming apparatus,
wherein the control device being configured to:
cause the image forming device to again form, on another sheet, a same image formed on the sheet, from which the sheet abnormality has been detected, and delivered to the escape tray, and to continue with image forming operation on subsequent sheets; and
decide, according to a predetermined condition, whether to allow the notification device to announce the sheet abnormality,
wherein the image forming apparatus further comprises:
a sheet sensor that detects whether a sheet is present in the escape tray; and
a user detection device that detects a user located within a predetermined range from the image forming apparatus,
wherein the control device causes the notification device to announce the sheet abnormality, when the user detection device has detected presence of the user, after causing the image forming device to execute the image forming operation of a series of images on the sheets, and causing the sheet transport mechanism to deliver the sheets subjected to the image forming operation of the series of images to one of the output tray and the escape tray, and when the sheet sensor has detected that the sheet is present on the escape tray.

2. The image forming apparatus according to claim 1, wherein the control device restricts the image forming device, after causing the notification device to announce the sheet abnormality, when the sheet jam sensor detected the occurrence of the sheet jam, and the sheet sensor detected that the sheet is present on the escape tray, from forming an image on the sheet, until the sheet sensor detects that the sheet is no longer present on the escape tray, and allows the image forming device to form the image, when the sheet sensor has detected that the sheet is no longer present on the escape tray.

3. An image forming apparatus comprising:
an image forming device that forms an image on a sheet;
a sheet transport mechanism that transports the sheet to the image forming device, the sheet transport mechanism including a sheet transport route, and a transport device provided on the sheet transport route and configured to transport the sheet;
a sheet abnormality detection device that detects abnormality of the sheet, including multi feed and a state of partially missing;

an output tray that receives the sheet transported by the sheet transport mechanism, and on which an image has been formed by the image forming device;

an escape tray that receives the sheet, from which abnormality has been detected by the sheet abnormality detection device, and delivered by the sheet transport mechanism, the escape tray being provided separately from the output tray;

a notification device that announces sheet abnormality; and a control device including a processor, and configured to control an overall operation of the image forming apparatus, wherein the control device being configured to:
cause the image forming device to again form, on another sheet, a same image formed on the sheet, from which the sheet abnormality has been detected, and delivered to the escape tray, and to continue with image forming operation on subsequent sheets; and decide, according to a predetermined condition, whether to allow the notification device to announce the sheet abnormality, wherein the image forming apparatus further comprises:
a sheet sensor that detects whether a sheet is present in the escape tray; and
a sheet jam sensor that detects occurrence of sheet jam on the sheet transport route,
wherein the control device causes the notification device to announce the sheet abnormality, when the sheet jam sensor has detected the occurrence of the sheet jam, and when the sheet sensor has detected that the sheet is present on the escape tray.

4. An image forming apparatus comprising:
an image forming device that forms an image on a sheet;
a sheet transport mechanism that transports the sheet to the image forming device, the sheet transport mechanism including a sheet transport route, and a transport device provided on the sheet transport route and configured to transport the sheet;
a sheet abnormality detection device that detects abnormality of the sheet, including multi feed and a state of partially missing;
an output tray that receives the sheet transported by the sheet transport mechanism, and on which an image has been formed by the image forming device;
an escape tray that receives the sheet, from which abnormality has been detected by the sheet abnormality detection device, and delivered by the sheet transport mechanism, the escape tray being provided separately from the output tray;
a notification device that announces sheet abnormality; and
a control device including a processor, and configured to control an overall operation of the image forming apparatus,
wherein the control device being configured to:
cause the image forming device to again form, on another sheet, a same image formed on the sheet, from which the sheet abnormality has been detected, and delivered to the escape tray, and to continue with image forming operation on subsequent sheets; and
decide, according to a predetermined condition, whether to allow the notification device to announce the sheet abnormality,
wherein the image forming apparatus further comprises:
a sheet sensor that detects whether a sheet is present in the escape tray; and an operation device through which an instruction from the user is inputted,
wherein, when presence of the sheet on the escape tray is detected by the sheet sensor, while the image forming device is forming an image on the sheet, the control device is configured to selectively perform, according to the instruction inputted through the operation device, one of:
a control including temporarily suspending the image forming operation of a series of images on the sheets by the image forming device, and causing the notification device to announce the presence of the sheet on the escape tray, when the user detection device has detected presence of the user, or when the sheet jam sensor has detected occurrence of sheet jam; and
a control including restricting the notification device from announcing the presence of the sheet on the escape tray, while the image forming device is forming an image on the sheet, and allowing the notification device to announce the presence of the sheet on the escape tray, after the image forming device has completed the image forming operation of the series of images on the sheets.

5. An image forming apparatus comprising:
an image forming device that forms an image on a sheet;
a sheet transport mechanism that transports the sheet to the image forming device, the sheet transport mechanism including a sheet transport route, and a transport device provided on the sheet transport route and configured to transport the sheet;
a sheet abnormality detection device that detects abnormality of the sheet, including multi feed and a state of partially missing;
an output tray that receives the sheet transported by the sheet transport mechanism, and on which an image has been formed by the image forming device;
an escape tray that receives the sheet, from which abnormality has been detected by the sheet abnormality detection device, and delivered by the sheet transport mechanism, the escape tray being provided separately from the output tray;
a notification device that announces sheet abnormality; and
a control device including a processor, and configured to control an overall operation of the image forming apparatus,
wherein the control device being configured to:
cause the image forming device to again form, on another sheet, a same image formed on the sheet, from which the sheet abnormality has been detected, and delivered to the escape tray, and to continue with image forming operation on subsequent sheets; and
decide, according to a predetermined condition, whether to allow the notification device to announce the sheet abnormality,
wherein the image forming apparatus further comprises a sheet sensor that detects whether a sheet is present in the escape tray,
wherein the control device is configured to:
set the image forming apparatus to a sleep mode;
restrict the notification device, when the sleep mode is cancelled, from announcing the sheet abnormality, despite the sheet sensor having detected the presence of the sheet on the escape tray;
allow the notification device to announce the sheet abnormality, when the user detection device has detected the presence of the user, or the sheet jam sensor has detected occurrence of sheet jam, after the sleep mode is cancelled; and restrict the image forming device, after the sleep mode is cancelled and after the notification device announced the sheet abnormality, from forming an image, until causing the notification device to stop announcing the sheet abnormality, because of the sheet sensor no longer detecting the presence of the sheet on the escape tray.

\* \* \* \* \*